(12) United States Patent
Bunker

(10) Patent No.: US 7,913,821 B2
(45) Date of Patent: Mar. 29, 2011

(54) METHOD AND APPARATUS FOR CONTROLLING A BRAKING SYSTEM

(75) Inventor: Kenneth James Bunker, Rearsby (GB)

(73) Assignee: BWI Company Limited S.A., Luxembourg (LU)

( * ) Notice: Subject to any disclaimer, the term of this patent is extended or adjusted under 35 U.S.C. 154(b) by 1871 days.

(21) Appl. No.: 10/089,011

(22) PCT Filed: Jul. 24, 2001

(86) PCT No.: PCT/GB01/03295
§ 371 (c)(1),
(2), (4) Date: Mar. 25, 2002

(87) PCT Pub. No.: WO02/08039
PCT Pub. Date: Jan. 31, 2002

(65) Prior Publication Data
US 2002/0153772 A1    Oct. 24, 2002

(30) Foreign Application Priority Data

Jul. 25, 2000  (GB) .................................. 0018154.5

(51) Int. Cl.
*F16D 55/36* (2006.01)
(52) U.S. Cl. ........................................ 188/71.5; 188/161
(58) Field of Classification Search .............. 188/71.5, 188/161
See application file for complete search history.

(56) References Cited

U.S. PATENT DOCUMENTS

| | | | |
|---|---|---|---|
| 2,724,252 A | 11/1955 | Schmal | |
| 2,737,033 A | 3/1956 | Bendall | |
| 2,764,261 A | 9/1956 | Bridges | |
| 3,146,860 A | 9/1964 | Wilson | |
| 3,191,735 A | 6/1965 | Wavak | |
| 3,233,704 A | 2/1966 | Strain et al. | |
| 3,642,101 A | 2/1972 | Hauth | |
| 3,754,624 A | 8/1973 | Eldred | |
| 3,837,420 A | 9/1974 | Kobelt | |
| 3,844,385 A | 10/1974 | Szekely | |
| 3,861,501 A | 1/1975 | Brooks et al. | |
| 3,915,272 A | 10/1975 | Maurice | |
| 3,940,159 A | 2/1976 | Pringle | |

(Continued)

FOREIGN PATENT DOCUMENTS

DE         1205345        11/1965

(Continued)

OTHER PUBLICATIONS

Motor Based Brake Control Techology Autotech 95—C498/12/161 8 Pgs.

(Continued)

*Primary Examiner* — Robert A Siconolfi
(74) *Attorney, Agent, or Firm* — Dickinson Wright PLLC

(57) ABSTRACT

Method and apparatus for controlling the front and rear wheel braking system of a road-going mass-produced motor car or automobile enables provision of brake-by-wire facilities utilizing an electrically-powered servo motor to generate brake-operating thrust which is applied to the interleaved friction elements and twin discs of a disc brake having axially slideable discs and a fixed caliper and disc and friction element-attitude control structure. The brake is of spot-type disc brake construction and the servo motor applies less brake-actuating thrust than is required for a comparable fixed disc and floating caliper construction.

4 Claims, 2 Drawing Sheets

U.S. PATENT DOCUMENTS

Figure 1:
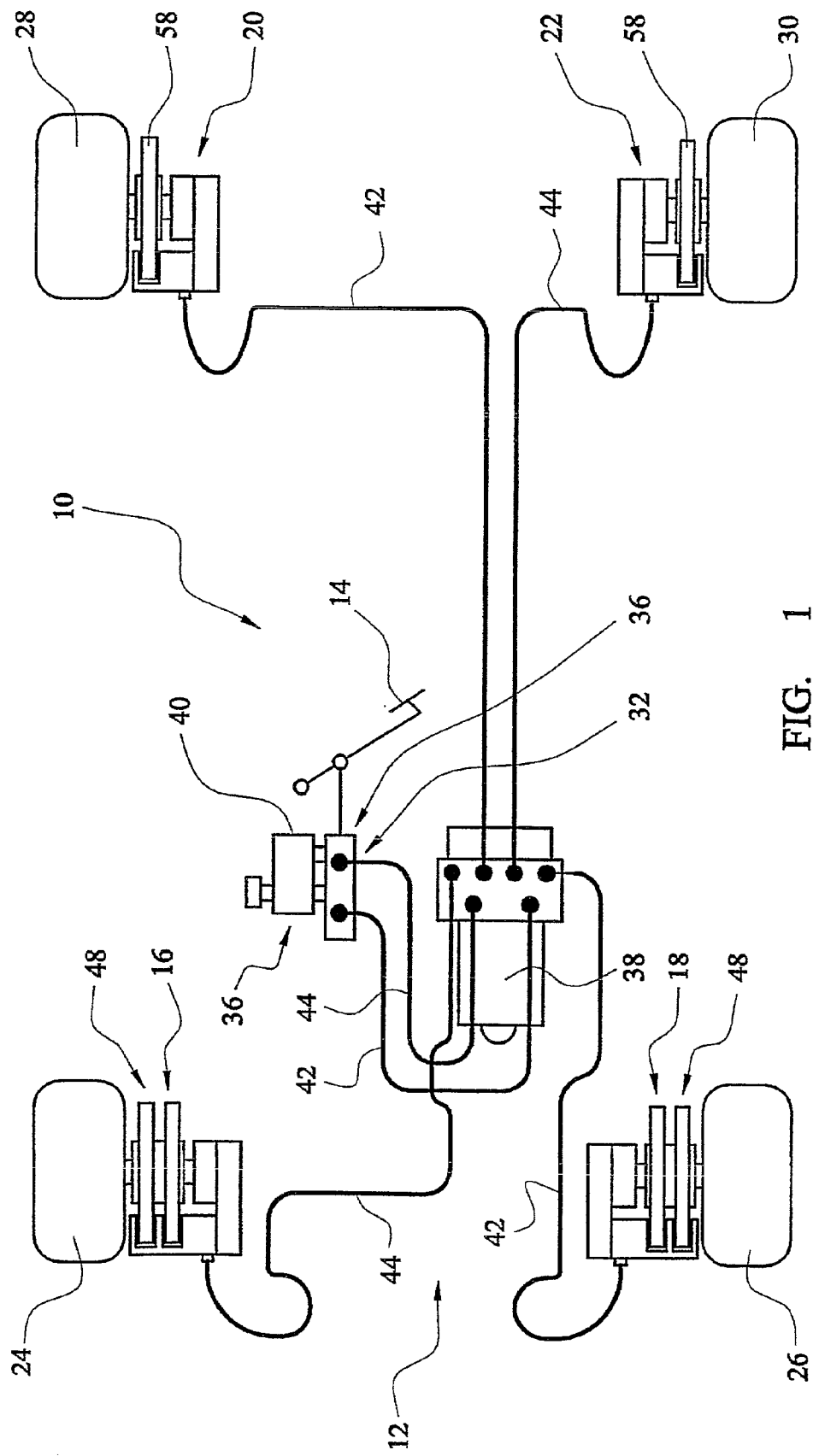

| | | | |
|---|---|---|---|
| 4,256,209 A | 3/1981 | Lupertz | |
| 4,318,306 A | 3/1982 | Fischer | |
| 4,479,569 A | 10/1984 | Kummer et al. | |
| 4,534,457 A | 8/1985 | Eltze et al. | |
| 4,576,255 A | 3/1986 | Mery et al. | |
| 4,673,065 A | 6/1987 | Gerard et al. | |
| 4,674,760 A | 6/1987 | Goulart | |
| 4,699,254 A | 10/1987 | Mery | |
| 4,784,244 A | 11/1988 | Carre et al. | |
| 4,804,073 A * | 2/1989 | Taig et al. | 188/72.1 |
| 4,844,206 A | 7/1989 | Casey | |
| 4,863,000 A | 9/1989 | Patel | |
| 4,865,160 A | 9/1989 | Casey | |
| 4,865,162 A | 9/1989 | Morris et al. | |
| 5,005,676 A | 4/1991 | Gassiat | |
| 5,358,079 A | 10/1994 | Brown | |
| 5,402,865 A | 4/1995 | Harker | |
| 5,674,026 A | 10/1997 | Ishibashi et al. | |
| 5,826,683 A * | 10/1998 | Murata et al. | 188/161 |
| 6,003,640 A * | 12/1999 | Ralea | 188/71.5 |
| 6,056,089 A | 5/2000 | Karlsson et al. | |
| 6,131,932 A | 10/2000 | Bunker | |
| 6,223,863 B1 | 5/2001 | Bunker | |
| 6,244,391 B1 | 6/2001 | Bunker | |
| 6,247,560 B1 | 6/2001 | Bunker | |
| 6,298,953 B1 | 10/2001 | Bunker | |
| 6,305,510 B1 | 10/2001 | Bunker | |
| 6,318,513 B1 | 11/2001 | Dietrich et al. | |

FOREIGN PATENT DOCUMENTS

| | | |
|---|---|---|
| DE | 2039003 | 2/1971 |
| DE | 2148797 | 4/1973 |
| DE | 3740373 A1 | 6/1988 |
| DE | 19810593 | 3/1998 |
| DE | 19819564 | 4/1998 |
| DE | 19810593 A1 | 6/1999 |
| EP | 0096553 A1 | 12/1983 |
| EP | 0296728 | 12/1988 |
| EP | 0296728 A2 | 12/1988 |
| GB | 662071 | 11/1951 |
| GB | 949018 | 2/1964 |
| GB | 1091693 | 11/1967 |
| GB | 1139699 | 1/1969 |
| GB | 1350350 | 4/1974 |
| GB | 1396503 | 6/1975 |
| GB | 1530461 | 11/1978 |
| GB | 2015122 A | 9/1979 |
| GB | 2031538 A | 4/1980 |
| GB | 2034834 | 6/1980 |
| GB | 2034834 A | 6/1980 |
| GB | 2150263 A | 6/1985 |
| GB | 2156021 A | 10/1985 |
| GB | 2156201 A | 10/1985 |
| GB | 2164712 A | 3/1986 |
| GB | 2184801 A | 7/1987 |
| GB | 2307528 | 5/1997 |
| GB | 2307528 | 5/1997 |
| GB | 2320299 A | 6/1998 |
| GB | 2320300 A | 6/1998 |
| GB | 2320301 A | 6/1998 |
| GB | 2340561 A | 2/2000 |
| GB | 2340562 A | 2/2000 |
| GB | 2340563 A | 2/2000 |
| GB | 2340564 A | 2/2000 |
| GB | 2346940 A | 8/2000 |
| GB | 2361969 A | 11/2001 |
| GB | 2361970 A | 11/2001 |
| GB | 2361971 A | 11/2001 |
| GB | 2361972 A | 11/2001 |
| GB | 2361973 A | 11/2001 |
| JP | 61166750 A | 7/1986 |
| WO | 83/01044 | 3/1983 |
| WO | 89/05924 | 6/1989 |
| WO | 96/18531 | 6/1996 |
| WO | 97/20150 | 6/1997 |
| WO | 97/30295 | 8/1997 |
| WO | WO 98/14715 | 4/1998 |
| WO | 98/25804 | 6/1998 |
| WO | 98/26191 | 6/1998 |
| WO | 98/26192 | 6/1998 |
| WO | WO 9913239 | 3/1999 |
| WO | 00/09900 | 2/2000 |
| WO | 00/09903 | 2/2000 |
| WO | 00/09904 | 2/2000 |
| WO | 00/09905 | 2/2000 |
| WO | 00/09909 | 2/2000 |
| WO | 00/09911 | 2/2000 |
| WO | 00/42332 | 7/2000 |
| WO | 01/03295 | 1/2001 |
| WO | 01/15948 | 3/2001 |
| WO | 01/33096 | 5/2001 |
| WO | 01/40671 | 6/2001 |
| WO | 01/86165 | 11/2001 |
| WO | 01/86167 | 11/2001 |

OTHER PUBLICATIONS

GB Search Report of Feb. 2, 2004.

* cited by examiner

METHOD AND APPARATUS FOR CONTROLLING A BRAKING SYSTEM

This invention relates to a method and apparatus for controlling a braking system and more particularly but not exclusively to a method and apparatus for controlling the front and rear wheel braking system of a road-going mass-produced motor car or automobile and the like, including small vans, pick-up trucks and other vehicles which differ from these mainly only in bodywork structure and/or detail. The particular aspect of the present invention which is of current demand and interest relates to the provision of a so-called brake-by-wire system for road-going mass-produced motor cars or automobiles. Non mass-produced vehicles are not subject to the same stringency of cost and space and other parameters as mass-produced vehicles.

The requirement for an effective brake-by-wire system for cars and automobiles, particularly mass-produced ones, has gained even more interest in recent years due to the availability of digitally-controlled systems for management of braking and other hardware which gives the opportunity for incorporating into mass-produced motor vehicles facilities for sophisticated control of braking and other systems using available data-processing hardware and software.

As is well known, current systems for the control of road-going mass produced motor cars and automobiles involve either totally hydraulic systems or hydraulic systems with an electronic:hydraulic interface at some point in the system. While such systems have been made to work reasonably effectively, it is clear to all concerned that a significant advance would be achieved if an entirely electronic/electric-powered system could be provided in order to enable the system to operate without such an interface and without the potential for interface-related technical difficulties and discontinuities.

However, although the search for a brake-by-wire system has intensified in recent years, and has been a matter of significant interest for several decades, yet the problem has not been solved. Many proposals exist for brakes, including disc brakes utilising electric actuation systems. None of these has been found to meet the practical and commercial and legal/regulatory requirements for such a system.

The present invention represents a different approach to this question from all prior proposals known to the applicants in the sense that the present invention seeks to provide such a system by addressing the (hitherto somewhat ignored) core question of the general design structure of the disc brake for such a system, instead of concentrating on other aspects of the system. In this way the embodiments of the present invention provide an approach to the design of a brake-by-wire system which enables such to be produced in a practical form which can use significant proportions of currently available parts and equipment.

We have discovered that the features of the embodiments described above lead to the surprising result that the long-sought-after goal of so-called brake-by-wire (in the sense of providing a braking system for a mass-produced motor car) can be met within the cost and space and performance parameters which have been firmly established by the many decades of development of hydraulic braking systems (to the point where they are now so firmly entrenched that the adoption of an alternative system for use on any significant production scale by a mass manufacturer of motor vehicles represents an almost impossible task). This is due to the simplicity and relatively low cost of such systems, not to mention their compact format.

We have discovered that this barrier to the provision of a brake-by-wire system for mass production vehicles can be met by a rather specific combination of features which leads to this unexpected result.

Although one factor in the equation concerns the necessary actuating force to be applied between the interacting brake friction surfaces, it is by no means the only significant factor and we have discovered that important related factors concern the provision of other features of the overall brake configuration.

Thus, for example, a not-insignificant factor concerns the features provided relating to the axial slideability of the two or more brake discs and the related spot-type construction of the brake itself. While of course it is well established that aircraft brakes employ a plurality of axially slidable discs and interleaved friction elements, nevertheless the actuating forces required in that regard (even on a per unit area of friction surface basis) may be quite high as compared with those conventionally employed in mass produced roadgoing motor cars despite the fundamental design difference as between full annulus aircraft brakes and spot-type road vehicle brakes. However, the infinitely different operating regimes in which aircraft brakes are required to perform (as compared with such brakes on motor cars) render the technical teaching available from such well-established prior use in aircraft brakes, of relatively little significance.

One such factor is the fact that the brakes of an aircraft such as a commercial airliner operate at most three or four times per day and on those occasions are required to perform a braking operation to a very substantial proportion of their total braking capacity (the entire structure being raised to a very substantial temperature in the post-landing phase) and this contrasts very remarkably with the situation of the brakes of mass-produced motor cars where multiple light applications of the brakes may be required throughout the day at a rate of many per minute.

Other factors include the service and use regimes under which aircraft and motor cars operate. These can be summarised in terms of endless use with minimum (within statutory regulations) service within the cost constraints of the mass market, for mass motor vehicle, and occasional use under highly serviced conditions (as imposed by air craft operating regulations), as applied to aircraft brakes.

We are aware that a brake-by-wire product to meet mass market requirements must offer an acceptable compromise between the conflicting demands of size and cost and actuation efficiency while meeting the demands discussed above and a brake which is able to meet these demanding factors represents a blend of complementary features which (we have found) represents a rather limited range of brake design features which cooperate in the necessary way.

Thus, in the embodiments of this invention as described below, we do not say that any one particular feature represent the sole key to the solution of the longstanding problem of braking-by-wire. What we do say is that we believe that the embodiments described below represent the first acceptable combination of features which enable a brake-by-wire system to be provided which has the potential to meet the requirements of the mass market.

It goes without saying of course that electric servo devices have been used for operating specific embodiments of brakes for mechanisms of various kinds, and no claim is made to the application of such servo devices to braking systems in a general way. Indeed, it is believed that the application of the present invention finds its main commercial and technical field of use in relation to that specific range of braking systems which is defined by such features as, firstly, at least two axially slideable brake discs, these discs being mounted for controlled axially slidable movement. The discs are also mounted so as to be under the control of attitude control means which defines their parallel planar relationship (while not necessarily ruling out some degree of non-planarity under the dynamic conditions of use). In addition, the system provides friction elements interleaved with the discs and corresponding attitude control means for the friction elements adapted to maintain their parallel planar relationship to the friction surfaces of the discs while permitting some degree of non-planarity under the dynamic conditions of use, as in the case of the discs. The disc position of the friction elements with respect to the discs is such that only a portion (and in one sector only of each disc) of the friction surfaces of the discs is engaged at any given time, thereby defining a spot-type relationship between the friction elements and the discs.

Other factors affecting the design parameters of a brake-by-wire system for viable commercial operation include the need for (under present regulations) a system default capability in which an hydraulic brake actuation system is able to provide a reserve braking function. Such systems can however be fairly readily integrated into an electrically operated braking system by the technically competent person on the basis of simple additional facilities provided in parallel to those of the electrically-operated actuating system.

Examples of disclosures relating to so-called brake-by-wire systems include the disclosures in WO97/30295 and WO 96/18531 and in a paper entitled "Autotech 951" reference C498/12/161 of the Institution of Mechanical Engineers entitled Motor Based Brake Control Technology. In these prior disclosures, the WO 295 specification concentrates its disclosure on details of the actual thrust generating device provided in the disc brake caliper. The WO 531 specification concentrates on the details of the hydraulic system. The I.Mech.E article concentrates on overall system design. None of the disclosures in these three representative publications recognises or provides any clear teaching of relevance with respect to the concept of the present invention namely the use of a particular brake structure as a basis for a commercially effective brake-by-wire system for the mass commercial market.

Numerous other examples of prior publications relating to electrically actuated brakes could be cited but in all cases known to the applicants the disc brake involved is of generally standard and unremarkable construction. Thus the WO 295 specification shows a conventional single fixed disc arrangement. The I.Mech.E article shows, where it does mention detailed brake construction, the use of a specific DC motor-operated electric screw device for the shoes of a drum brake. There appears to be no disclosure in the state of the art to the effect that a viable brake-by-wire system requires the use of a certain class of disc brake construction in accordance with the teachings of the present invention.

Examples of many published braking systems in which an electric motor or drive of some kind is used to actuate the brakes are:

GB 23 07 528A (Mercedes-Benz)
GB 21 56 021A (Teves)

in which there are disclosed, respectively, an electro hydraulic brake system for a road vehicle, and a process and apparatus for the control of a brake unit for automotive vehicles. Both of these specifications take the conventional approach of discussing principally the details of the construction and mode of operation of the control system, while leaving to one side the question of significance of the brake construction itself. The Teves document does mention that the brake in question is a spot-type disc brake as shown in FIGS. 1 and 3.

The Mercedes Benz document mainly refers to front-wheel brakes 11 and 12 and rear-wheel brakes 13 and 14 which can be actuated by means of a brake-pressure control device. The diagrammatic representation of these suggests they may also be spot-type disc brakes. Certainly, there is no explicit disclosure of spot-type disc brakes of the sliding disc kind, and not even a hint that the construction of the brakes themselves may have the slightest relevance to the technical/commercial feasibility of such a braking system for automotive vehicles.

There is disclosed in WO 98/26191 (T & N Technology Limited—assigned to Delphi Technologies Inc), our reference 2560, published Jun. 18, 1998, one example of a brake having two axially slidable brake discs with springs between the brake discs and the hub and between the friction pads and the caliper. Such is just one example of a spot-type automotive disc brake employing slidable discs which, though not numerous, certainly had been proposed on paper prior to the WO 191 specification.

However, easy though it is to find prior paper publications relating to the features which co-operate to provide the working combination of the present invention on a mere hindsight basis, more difficult is the task of finding any explicit prior disclosure which has the slightest relevance to the question of whether such a combination would be tested with any more expectation of a favourable result than any other electrical brake operating system and one or more of the tens of thousands of published drum and disc brake systems for automotive vehicles. As indicated above, the above Mercedes-Benz and Teves documents contain no such suggestion. Equally, the T & N—assigned to Delphi document concerns itself entirely with the question of how to construct the fixed caliper of a slidable-disc disc brake system in a manner which is cost-effectively strong for the purposes concerned.

In this connection it bears mentioning that the size-reduction implications of the present invention in relation to electrical actuators for braking systems are necessarily defined by reference to the required brake actuating thrust which, it will be appreciated, has a proportional relationship to actuator size and acceptability or not for mass production in the same vehicle market (in terms of actuator size) is obviously a matter of degree in relation to size. The actuating thrust requirement is likewise inter-related to the number of brake discs involved and the use of the resultant disc brake at the front or rear of the vehicle. In the case of a small vehicle with an appropriate front/rear braking effort distribution ratio, the level of thrust required for brake actuation at the rear brings a rear single-disc disc brake within the limits in terms of actuating thrust to which the embodiments of the present invention relate.

According to the invention there is provided a method and apparatus as defined in the accompanying claims.

In embodiments of the present invention it may not in all cases be essential to employ two or more slidable discs since under certain vehicle design and weight operating parameters a single disc may be sufficient. For example, in the case of certain relatively small mass produced cars, the percentage braking distribution between front and rear may be as unequal as 70:30. In such a case it may well be sufficient to provide a single slidable disc for each rear brake, while the front brakes have twin discs in view of their more than double (the rear) share of the braking burden, and it is to be understood that the features of the embodiments of the present invention which lead to the advantages discussed above provide a combination of brake design features which, we have discovered, interact to meet the performance and weight and size criteria needed for brake-by-wire functions in a modern mass-produced motor car, rather than achieving the desired advantages as a direct result of one or two specific design features acting or cooperating to provide one specific function in the usual way.

Further features which lead, in combination, to the benefits provided by the embodiments of the invention include the brake disc and friction element attitude-control and dynamics control systems whereby the well-established difficulties associated with maintenance of a proper parallel planar relationship between the interacting (when the brake is applied) surfaces of the brake is achieved even under the dynamic conditions of use which arise in a modern mass produced motor vehicle, not ignoring the minimal service provision for such vehicles which has been discussed above.

In most embodiments the attitude and dynamics control systems are provided by resilient means in the form of a wire or leaf-type spring or springs. There is considerable scope for design flexibility in this area of the brake's construction and reference is directed to our pending unpublished GB patent applications in this respect (our references P54615/6/7/8/9GB and 30039/40/1/2/3 serial numbers:

GB 00 10 810.0
GB 00 10 808.4
GB 00 10 807.6
GB 00 10 805.0
GB 00 10 804.3

For disclosure purposes we incorporate herein the entire disclosure of the above identified co-pending applications herein.

One aspect of the technical basis on which the embodiments of the present invention meet the requirements for providing a viable system for braking-by-wire relates to the design concept (concerning brake structural features) of providing a central hub or mounting on which the discs or disc are axially slidable. In the case where two or more discs are provided in this spot-type disc brake, with interleaved friction elements and an actuation system to cause axially-directed compression of the assembly in the sense of bringing the friction surfaces into braking engagement, the availability of additional braking surfaces for generating the friction effect has the result that the force per unit area needed to be applied to the friction elements is correspondingly reduced, thereby enabling a simplification of the arrangements needed for the generation of the brake-actuating forces from an electrically-based servo motor. However, these features are inter-related to other features of the brake, and indeed to the front/rear positioning and loading of the specific embodiment of the invention, in view of the fact (discussed elsewhere herein) that a single disc assembly provided on an axially-slidable basis is sufficient for rear vehicle wheel braking purposes in many cases for motor cars of small to modest size in the mass-produced market.

Therefore, we summarise the features of the embodiments of the invention in terms of their combined effect in meeting the requirements of braking-by-wire and with an emphasis on the principal brake design features concerning at least one or more axially slidable discs mounted on a central hub or the like and interleaved with an assembly comprising at least one correspondingly axially slidable friction element, the provision of means for attitude and dynamics/movement control in use under the actuating effect of an electrically-energised servo motor which generates in use an actuating force less than that required to operate a front vehicle wheel disc brake system of a same or similar vehicle on a fixed disc and moving caliper basis.

Figure 2:
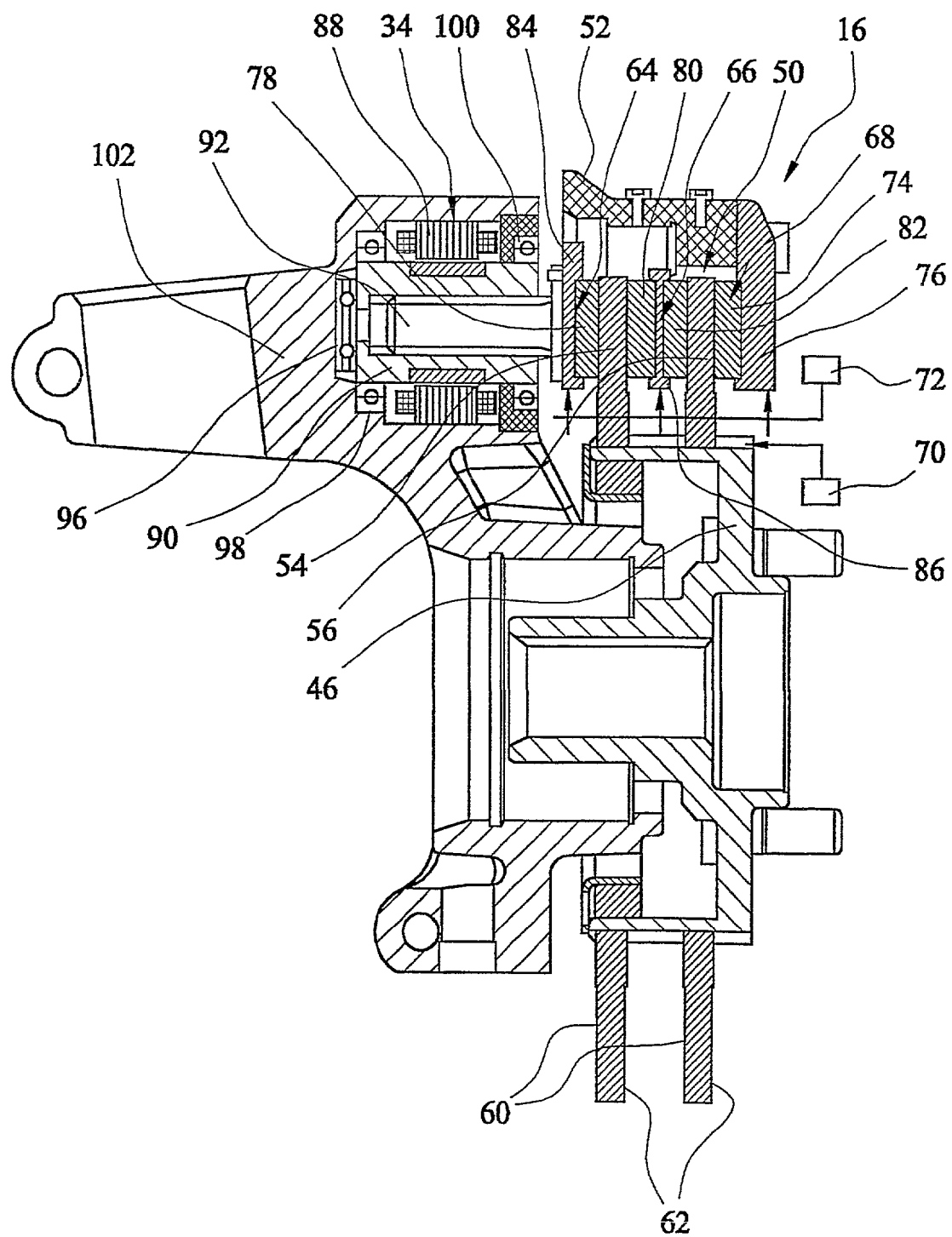

Embodiments of the invention will now be described by way of example with reference to the accompanying drawings in which:

FIG. 1 shows apparatus adapted to provide a method for controlling the front and rear wheel braking systems of a road-going mass-produced motor car or automobile; and FIG. 2 shows, on a considerably larger scale, a section through a wheel hub and associated disc brake forming a front wheel assembly of the vehicle of FIG. 1.

As shown in FIG. 1, a braking system 10 of a road-going mass-produced motor car or automobile 12 comprises a driver-operable brake actuating control member 14 in the form of a foot pedal. Front wheel brakes 16, 18 and rear wheel brakes 20, 22 are provided for the front and rear wheels 24, 26 and 28, 30 respectively.

A brake-actuating and control system 32 for the brakes 16, 18 and 20, 22 comprises electrically-powered servo motors 34, adapted to generate brake-actuating thrust in at least the front wheel brakes. In fact, all four brakes 16, 18 and 20, 22 are provided with such servo motors, to be seen in FIG. 2, and which will be more fully described below.

As shown in FIG. 1, braking system 10 comprises a dual control system 36 whereby foot pedal 14 primarily controls system 32 for the electrically powered servo motors 34 but is provided in addition with a default-operated hydraulic control system 38 to meet current regulatory requirements.

For simplicity of illustration in FIG. 1, it is to be understood that the dual control system 36 incorporating both the electric control system 32 and a hydraulic control system 38 are represented by the indicated master cylinder and reservoir assembly to which brake pedal 14 is connected, and the control lines of the electronic control system are likewise represented by the hydraulic lines 42, 44 of the twin hydraulic circuit.

The brake actuating and controls system 32 for the servo motors 34 further comprises means (not shown as such) for modulating the brake-actuating thrust (as generated by servo motors 34) in accordance-with sensed vehicle operating parameters, for example sensed wheel skid in the case of the provision of an anti-skid braking system (ABS), or the like.

As will be apparent from FIG. 2 of the drawings, the front and rear wheel brakes 14, 16 and 20, 22 are of spot-type disc brake construction in which a central hub or mounting means 46 is adapted to rotate with its respective vehicle wheel 24, 26, 28 or 30 and to have its associated brake discs 48 mounted thereon for rotation with the hub, the discs 48 having associated friction elements indicated generally at 50 as an assembly, which are mounted on a corresponding fixed caliper 52 carried on the fixed (but steerable) structure 102 of the wheel mounting and which straddles the outer periphery of the discs 48 and provides guide means and a mounting for the friction 50 elements and their corresponding actuation means comprising the electrically powered servo motors 34.

As regards the spot-type construction of the brakes 16, 18 and 20, 22, each brake is located in its own defined sector of the periphery of the brake disc and hub assembly, being constructed to act on the respective discs only over a portion of their annular braking surfaces, such portion being defined by the circumferentially extending width of the pads of friction material provided on the friction elements.

As is also clearly shown in FIG. 2, the assembly of the brake discs 48 comprises twin brake discs 54, 56 for the front brakes 16, 18 and single brake discs 58 for the rear wheel brakes 28, 30. The discs 54, 56 of the front wheel brakes 16, 18 are mounted on their respective hubs 46 in side-by-side relationship and with a generally parallel planar relationship between the braking surfaces 60, 62 of the discs.

The assembly of friction elements 50 comprises, as shown in FIG. 2, 3 friction elements 64, 66, 68 interleaved with the twin discs 54, 56 for frictional engagement with the four braking surfaces 60, 62 of the two discs on 54, 56 on the opposite sides of the discs 54, 56 in the region of the periphery thereof, the friction elements 50 being mounted on fixed caliper 52 at a fixed position with respect to hub 46.

Shown diagrammatically in FIG. 2 in respect of the front wheel brake 16 thereof are attitude and movement control means 70 for the brake discs 54, 56 and corresponding attitude and movement control means 72 for the friction elements 64, 66, 68, such control means acting, respectively, between central hub 46 and the brake discs 44, 46 and between caliper 52 and the friction elements 64, 66, 68.

The attitude and movement control means 70, 72 operate to control the discs and the friction elements with respect to their mountings at least during the time interval between successive actuations of the electrically-powered servo motors 34 to ensure proper alignment of the discs and friction elements in respective parallel relationship while permitting the necessary sliding movement into and out of engagement. For the details of the structure and arrangement of such attitude and movement control means we incorporate herein the disclosure of our above-identified pending GB patent applications. Broadly speaking, such control means comprise leaf or wire springs acting between the mounting structure and the mounted structure which has sufficient resilient force to maintain the mounted structure in its required defined attitude while permitting controlled sliding movement and preventing rattling.

As mentioned above, attitude control means 70, 72 as shown in FIG. 2 are indicated diagrammatically the former acting between the friction elements 64, 66, 68 and caliper 52, and the latter between hub 46 and brake discs 54, 56 (in the case of the front wheel brake 16, 18. It needs to be understood that outer friction element 68 comprises a pad 74 bonded or fixed to the outer plate 76 of caliper 52, and is thus fixed and requires no attitude or movement control. However, friction elements 64, 66 comprise pads of friction material 78, 80, and 82 bonded to metallic backing plates 84, 86 which are slidably mounted on caliper 52 and controlled by the attitude and movement control springs 72.

In the case of brake discs 54, 56, these are controlled by the attitude and movement and control means 70 acting between the hub 46 and the discs themselves.

In use, servo motors 34 draw electrical power from the vehicle battery to cause brake-actuating thrust to be generated and applied to the friction element assemblies to cause brake engagement. The mode of operation for the rear wheel brakes 28, 30 is much the same as for the front wheel brakes 24, 26 only without the central friction element between the twin discs which are provided in the front wheel brakes.

Turning to the construction of the servomotors 34, these comprise an outer stator 88 and an inner annular rotor 90 which is screw-threadedly engaged with the central threaded shank of an actuating spindle 92 which cooperates with the adjacent backing plate of the friction elements assembly to apply brake clamping thrust. A corresponding thrust race 96 is provided at the inner end of the assembly and corresponding ball races 98, 100 to serve to mount rotor 90 within the main brake housing 102. On energization of servomotor 34, rotor 90 rotates causing spindle 92 to be extended to apply the brake. Reverse rotation of the rotor 90 occurs for disengagement. The default-operated hydraulic control system 38 is connected to a piston and cylinder assembly (not shown) formed in rotor 90 whereby spindle 92 and its threaded sleeve can be extended (as the piston) on pressurization of the cylinder from hydraulic lines 42, 44.

In a further embodiment, not illustrated, there is provided a servo motor-operated hydraulic pump device adapted to deliver hydraulic pressure to a hydraulic piston and cylinder assembly within housing 102 and which is provided instead of servo motor 34 and its rotor and spindle assembly.

What is claimed is:

1. A method of controlling a braking system of a road-going automobile, comprising:
    providing the vehicle with front and back brakes in which the front brakes include a pair of rotatable wheel hubs, at least two spot-type brake discs mounted on each of the wheel hubs and supported for rotation with the wheel hubs and for axial sliding movement on the wheel hubs and each brake disc presenting opposite circumferentially continuous annular braking surfaces, at least three spot-type friction elements mounted on a stationary brake caliper associated with each wheel hub and interleaved with the associated brake discs and being circumferentially discontinuous so as to overly only an angular sector of the annular braking surfaces of the brake discs, and with at least two of the friction elements being axially slidable on its respective brake caliper for engaging and disengaging the braking surfaces of the brake discs;
    providing a rotating electric actuator having a stator and a rotor with the electric actuator operative to move the friction elements into braking engagement with the brake discs; and
    controlling the attitude and movement of the brake discs with respect to the wheel hub and controlling the attitude and movement of the friction elements with respect to the caliper to maintain the brake discs and friction elements in parallel alignment during sliding movement into and out of braking engagement with one another.

2. A method according to claim 1 wherein the rotating electric actuator includes a spindle and further including the step of actuating the spindle to move the friction elements into braking engagement with the brake discs.

3. A method according to claim 2 wherein the spindle is threadedly engaged with the rotor and wherein the step of actuating the spindle is further defined as operating the electric actuator to rotate the rotor for moving the spindle axially relative to a rotational axis of the rotor.

4. A method according to claim 2 wherein the rotating electric actuator is further defined as a servo motor and further including the step of operating the servo motor to rotate the rotor and move the spindle axially relative to a rotational axis the rotor.

* * * * *

UNITED STATES PATENT AND TRADEMARK OFFICE
CERTIFICATE OF CORRECTION

PATENT NO. : 7,913,821 B2  
APPLICATION NO. : 10/089011  
DATED : March 29, 2011  
INVENTOR(S) : Kenneth James Bunker Page 1 of 1

It is certified that error appears in the above-identified patent and that said Letters Patent is hereby corrected as shown below:

Column 1, Line 41: "utilsing" should read -- utilizing --.
Column 2, Line 39: "summarised" should read -- summarized --.
Column 3, Line 28: "951" should read -- 95 --.
Column 3, Line 37: "recognises" should read -- recognizes --.
Column 5, Line 52: "summarise" should read -- summarize --.
Column 5, Line 60: "electrically-energised" should read -- electrically-energized --.
Column 6, Line 49: "friction 50 elements" should read -- friction elements 50 --.
Column 7, Line 1: "on 54, 56 on the" should read -- 54, 56 on the --.

Signed and Sealed this
Thirty-first Day of May, 2011

David J. Kappos
*Director of the United States Patent and Trademark Office*